(12) United States Patent
Lee et al.

(10) Patent No.: US 7,503,749 B2
(45) Date of Patent: Mar. 17, 2009

(54) TURBINE NOZZLE WITH TRAILING EDGE CONVECTION AND FILM COOLING

(75) Inventors: Ching-Pang Lee, Cincinnati, OH (US); Steven Robert Brassfield, Cincinnati, OH (US); Michael Joseph Danowski, Cincinnati, OH (US); Hardev Singh, Mason, OH (US)

(73) Assignee: General Electric Company, Schenectady, NY (US)

( * ) Notice: Subject to any disclaimer, the term of this patent is extended or adjusted under 35 U.S.C. 154(b) by 601 days.

(21) Appl. No.: 11/097,474

(22) Filed: Apr. 1, 2005

(65) Prior Publication Data

US 2006/0222496 A1   Oct. 5, 2006

(51) Int. Cl.
*F01D 5/18* (2006.01)
(52) U.S. Cl. .................................. 416/97 R; 415/115
(58) Field of Classification Search ................ 415/115; 416/97 R
See application file for complete search history.

(56) References Cited

U.S. PATENT DOCUMENTS

| 6,176,678 | B1 | 1/2001 | Brainch et al. | |
| 6,612,811 | B2* | 9/2003 | Morgan et al. | 416/97 R |
| 7,246,999 | B2* | 7/2007 | Manning et al. | 416/97 R |
| 7,278,827 | B2* | 10/2007 | Boury et al. | 416/97 R |

* cited by examiner

*Primary Examiner*—Ninh H Nguyen
(74) *Attorney, Agent, or Firm*—Adams Intellectual Property Law, P.A.; William Scott Andes, Esq.

(57) ABSTRACT

An airfoil for a gas turbine engine has opposed pressure and suction sidewalls extending between a leading edge and a trailing edge. The airfoil includes an array of radially-spaced apart longitudinally-extending lands which define a plurality of trailing edge slots therebetween. Each of the trailing edge slots has an inlet in fluid communication with an interior of the airfoil and an exit in fluid communication with the trailing edge. At least one of the lands is tapered such that a width of the land measured in a radial direction decreases from the suction sidewall to the pressure sidewall.

9 Claims, 6 Drawing Sheets

US 7,503,749 B2

TURBINE NOZZLE WITH TRAILING EDGE CONVECTION AND FILM COOLING

BACKGROUND OF THE INVENTION

This invention relates generally to gas turbine components, and more particularly to turbine airfoils.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In a turbofan engine, which typically includes a fan placed at the front of the core engine, a high pressure turbine powers the compressor of the core engine. A low pressure turbine is disposed downstream from the high pressure turbine for powering the fan. Each turbine stage commonly includes a stationary turbine nozzle followed in turn by a turbine rotor, each of which includes a plurality of hollow airfoils which are cooled by a combination of internal convective cooling and gas side film cooling.

For reasons of aerodynamic efficiency, the high pressure turbine blades or nozzles typically have thin trailing edges and therefore can not accommodate convection cooling openings (i.e. holes or slots) extending all the way to the end of the trailing edge. These openings typically break out from the pressure side surface upstream of the trailing edge. The cooling air leaving the openings mixes with some of the external hot gases and becomes film cooling to protect the downstream trailing edge surface. Slot film cooling typically is the only cooling mechanism for the very aft end of the trailing edge. Trailing edge slots are typically discrete and separated with partition walls. The partition walls are extended outside the slots to form so-called lands. The lands have a tapered height in an axial direction and provide structural support for the trailing edge. These lands are exposed to the hot gas on pressure side and receive a very limited amount of film cooling spilled over from the slots. Therefore, the lands are typically much hotter than the suction side wall on the slot floor between lands. Accordingly, there is a need for providing cooling for these lands.

BRIEF SUMMARY OF THE INVENTION

The above-mentioned need is met by the present invention, which according to one aspect provides an airfoil for a gas turbine engine, having opposed pressure and suction sidewalls extending between a leading edge and a trailing edge. The airfoil includes an array of radially-spaced apart longitudinally-extending lands defining a plurality of trailing edge slots therebetween. Each of the trailing edge slots has an inlet in fluid communication with an interior of the airfoil and an exit in fluid communication with the trailing edge. At least one of the lands is tapered such that a width of the land measured in a radial direction decreases from the suction sidewall to the pressure sidewall.

According to another aspect of the invention, an airfoil for a gas turbine engine has opposed pressure and suction sidewalls extending between a leading edge and a trailing edge. The airfoil includes an array of radially-spaced apart longitudinally-extending lands defining a plurality of trailing edge slots therebetween. Each of the trailing edge slots has an inlet in fluid communication with an interior of the airfoil and an exit in fluid communication with the trailing edge. At least one of the lands is tapered such that a width of the land measured in a radial direction decreases from the suction sidewall to the pressure sidewall; a width of the land measured in a radial direction decreases from the exit to the trailing edge; and a thickness of the land measured in a circumferential direction decreases from the exit to the trailing edge.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
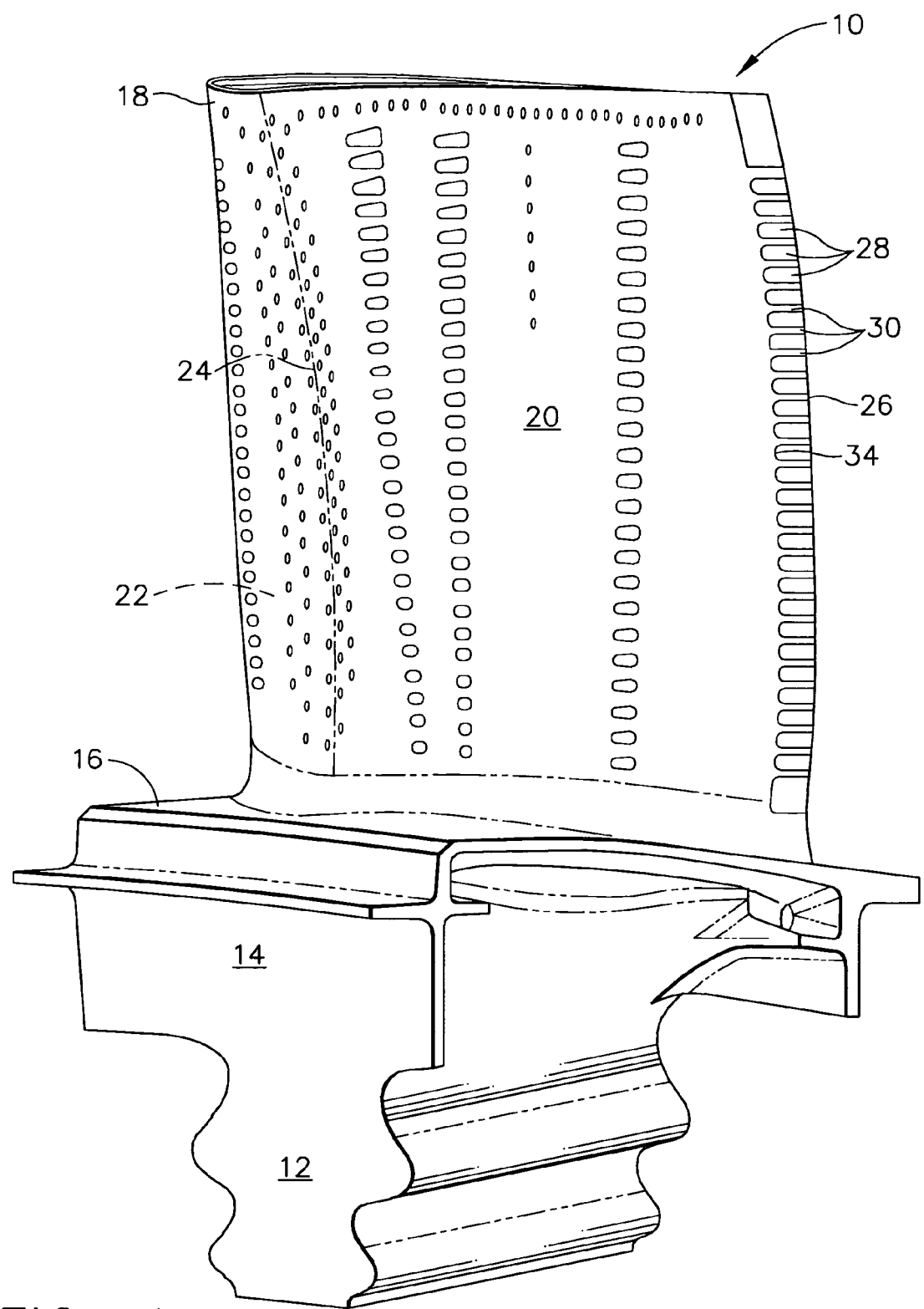
FIG. 1 is a perspective view of a prior art turbine blade.

Referring to the drawings wherein identical reference numerals denote the same elements throughout the various views, FIG. 1 illustrates a prior art turbine blade 10. The turbine blade 10 includes a conventional dovetail 12 for radially retaining the blade 10 to the disk as it rotates during operation. A blade shank 14 extends radially upwardly from the dovetail 12 and terminates in a platform 16 that projects laterally outwardly from and surrounds the shank 14. The platform defines a portion of the combustion gases past the turbine blade 10. A hollow airfoil 18 extends radially outwardly from the platform 16 and into the hot gas stream. The airfoil 18 has a concave pressure sidewall 20 and a convex suction sidewall 22 joined together at a leading edge 24 and at a trailing edge 26. The blade incorporates a number of trailing edge slots 28 on the pressure side 20 of the airfoil. The trailing edge slots 28 are separated by a number of longitudinally extending lands 30, which extend from exits 34 of the trailing edge slots 28 to the trailing edge 26.

Figure 2:
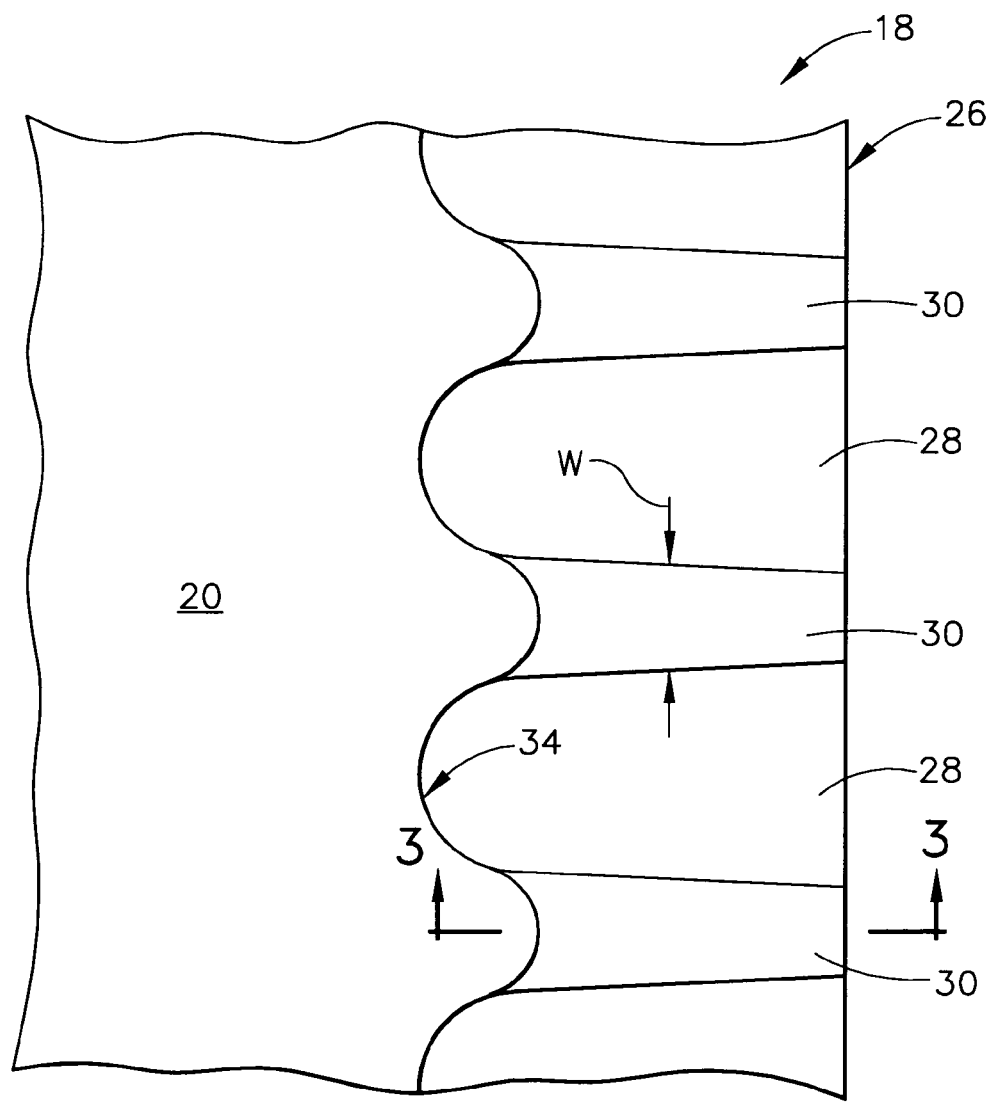
FIG. 2 is a side view of a portion of the turbine blade of FIG. 1.
Figure 3:
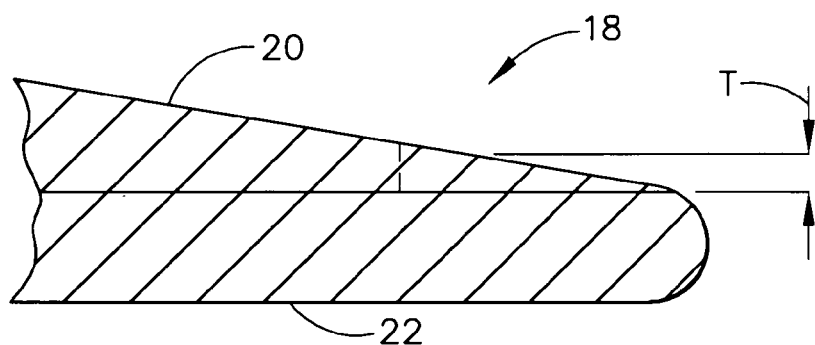
FIG. 3 is a view taken along lines 3-3 of FIG. 2.

FIGS. 2 and 3 illustrate the trailing edge portion of the turbine blade 10 in more detail. The width "w" of each land 30 measured in a radial direction decreases from the trailing edge slot exit 34 to the trailing edge 26. The thickness "t" of each land 30 measured in a circumferential direction (i.e. from the pressure sidewall 20 of the airfoil 18 to the suction sidewall 22 of the airfoil) decreases from the trailing edge slot exit 34 to the trailing edge 26.

In operation, cooling air is supplied to the interior of the airfoil 18. After optionally being used for other cooling purposes, the cooling air transitions through the trailing edge slots 28 to cool the trailing edge 26. The lands 30 are exposed to the hot gas at the pressure sidewall 20 and receive a very limited amount of film cooling spilled over from the slots 28. Therefore, the lands 30 are typically much hotter than the suction sidewall 22 on the slot floor between lands 30.

Figure 4:
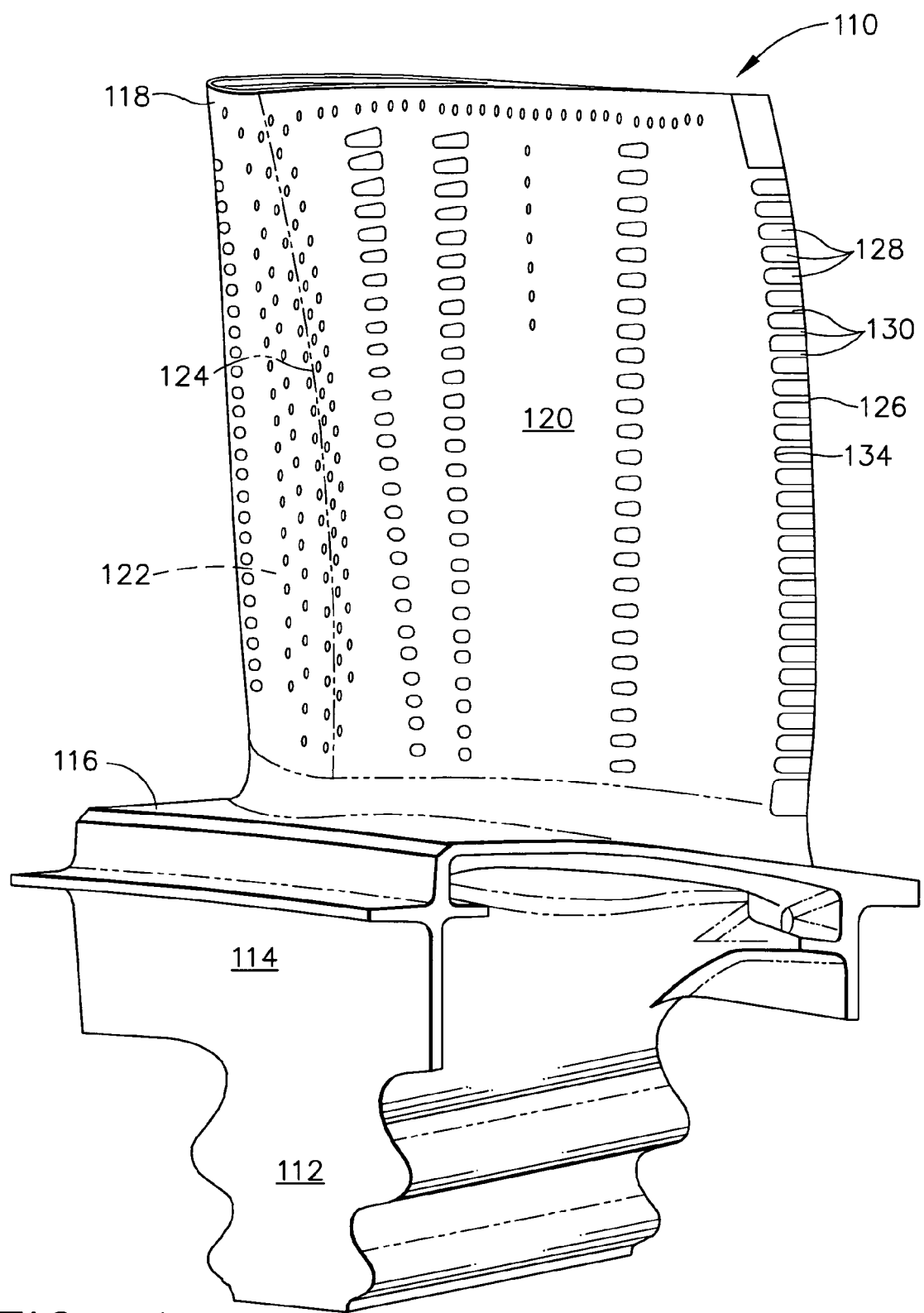
FIG. 4 is a perspective view of a turbine blade constructed in accordance with the present invention.
Figure 5:
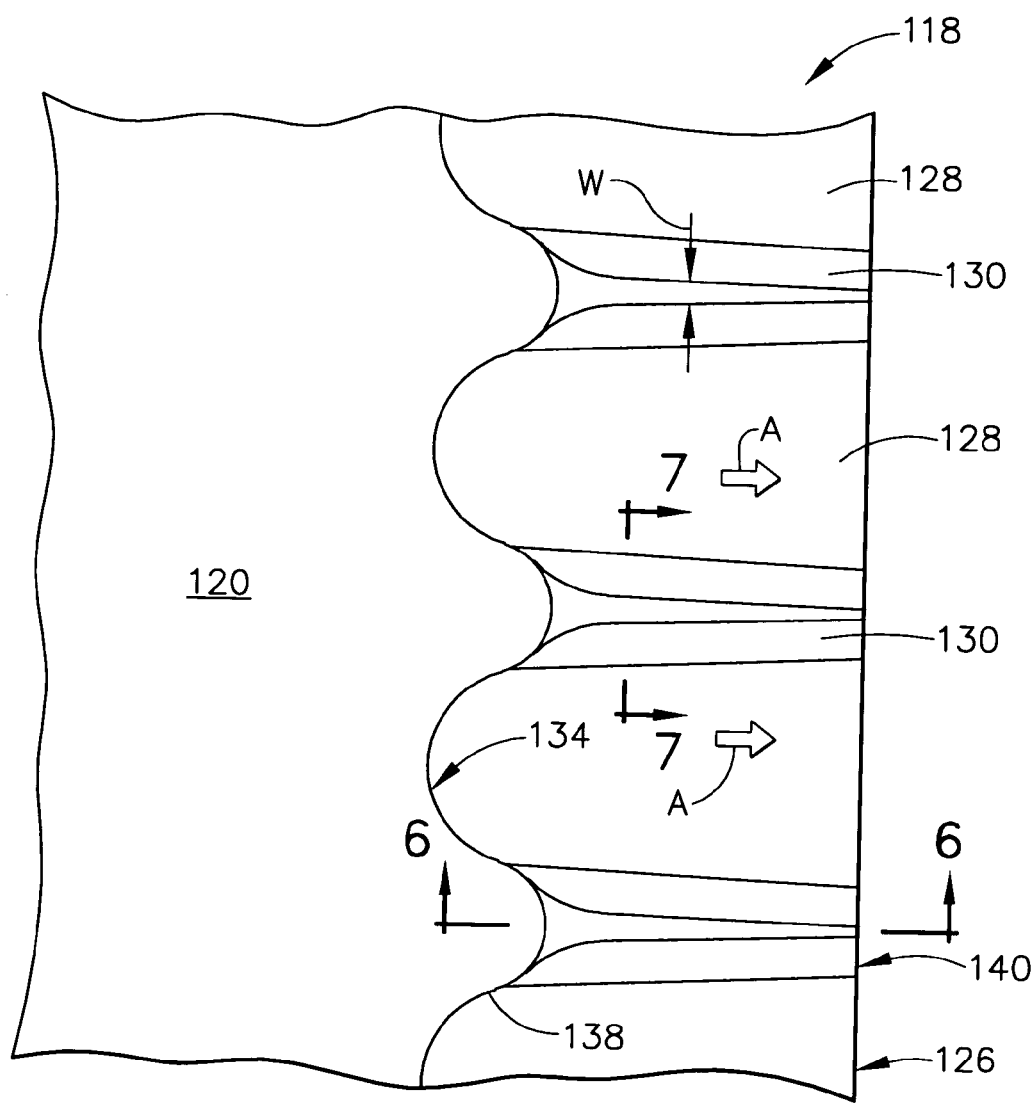
FIG. 5 is a side view of a portion of the turbine blade of FIG. 4.
Figure 6:
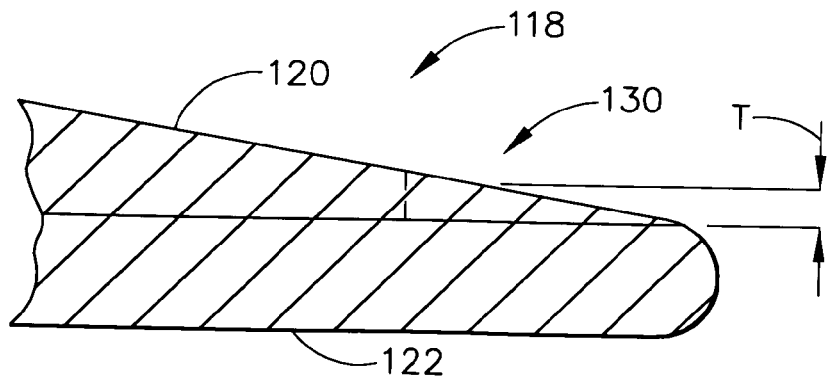
FIG. 6 is a view taken along lines 6-6 of FIG. 5.

An exemplary turbine blade 110 constructed according to the present invention is shown in FIG. 4. It is noted that the present invention is equally applicable to other types of hollow cooled airfoils, for example stationary turbine nozzles. The turbine blade 110 includes a dovetail 112, a blade shank 114, and a platform 116. A hollow airfoil 118 extends radially outwardly from the platform 116 and into the hot gas stream. The airfoil 118 has a concave pressure sidewall 120 and a convex suction sidewall 122 joined together at a leading edge 124 and at a trailing edge 126. The blade 110 is similar in overall construction to the prior art blade 10 except for the trailing edge portion, which is shown in more detail in FIGS. 5, 6, and 7. The blade 110 incorporates a number of trailing edge slots 128 on the pressure sidewall 120 of the airfoil 118. The trailing edge slots 128 are separated by a number of longitudinally extending lands 130.

Figure 7:
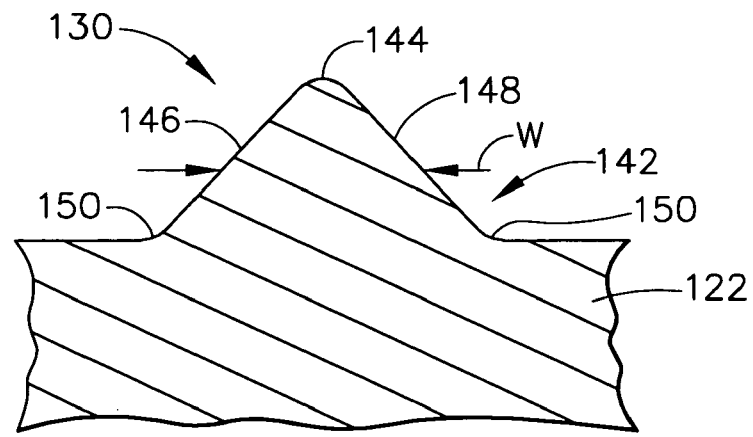
FIG. 7 is a view taken along lines 7-7 of FIG. 5, showing a cross-sectional shape of a trailing edge land.

Each trailing edge slot 128 has an inlet (not shown) in fluid communication with the interior of the airfoil 118 and a downstream exit 134 in which exhausts through the pressure sidewall 120 of the blade 110 upstream of the trailing edge 126. Each land 130 has a forward end 138 at the trailing slot exit 134 and an aft end 140 at the trailing edge 126 of the airfoil 118. As shown in FIG. 7, each land 130 also has a base 142 adjacent the suction sidewall 122, and a top surface 144 flush with the pressure sidewall 120. A pair of side faces 146 and 148 extend between the forward end 138 and aft end 140 of each land 130.

The lands 130 are tapered to reduce the amount of surface area at the hottest locations and to improve cooling film coverage. In the example shown in FIGS. 5, 6, and 7, the lands 130 are tapered in three directions. The width "W" of each land 130 measured in a radial direction decreases from the trailing edge slot exit 134 to the trailing edge 126. The thickness "T" of each land 130 measured in a circumferential direction (i.e. from the pressure sidewall 120 of the airfoil 118 to the suction sidewall 122 of the airfoil) decreases from the trailing edge slot exit 134 to the trailing edge 126. Finally, the width "W" of each land 130 measured in a radial direction decreases from the base 142 of the land 130 (i.e. adjacent the suction sidewall 122) to the top surface 144 of the land 130.

Figure 8:
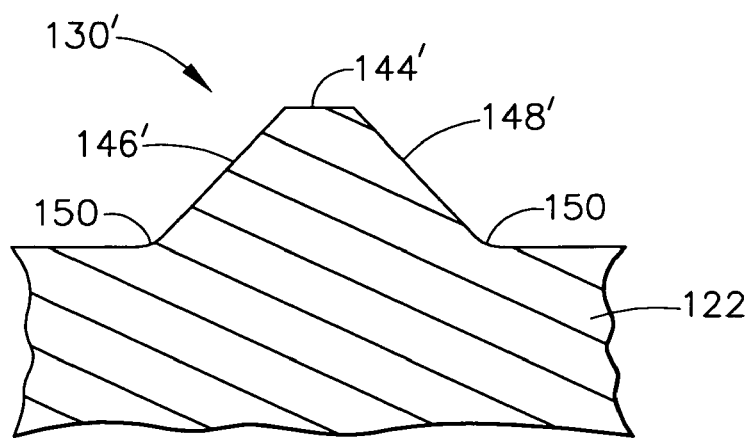
FIG. 8 is a cross-sectional view of an alternative trailing edge land.
Figure 9:
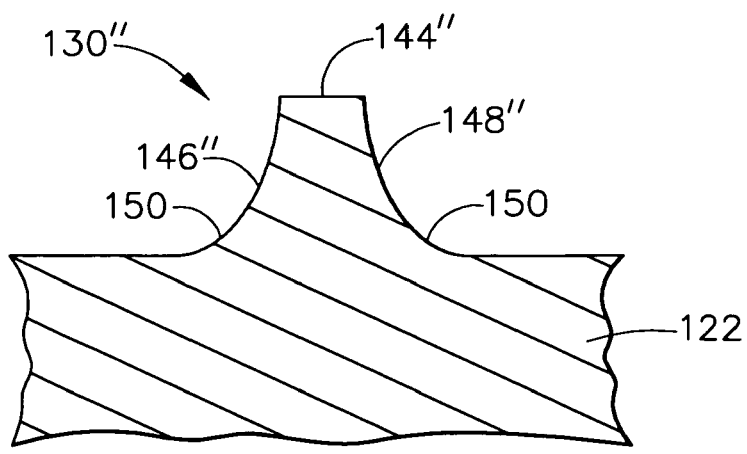
FIG. 9 is a cross-sectional view of another alternative trailing edge land.

The taper of the width "W" from the base 142 to the top surface 144 may be implemented in various ways. for example, as shown in FIG. 7, the side faces 146 and 148 of the land 130 are generally planar, and the top surface 144 is a curved surface with a small circular radius. FIG. 8 depicts another land 130' in which the top surface 144' is substantially planar and has a width greater than that of the top surface 144. Such a design may be easier to produce than the radiused top surface 144. FIG. 9 shows yet another alternative land 130" in which the side faces 146" and 148" have a concave curvature, and the top surface 144" is substantially planar. This may help diffusion of the cooling flow exiting the trailing edge slot 128 and promote film coverage of the land 130".

Figure 10:
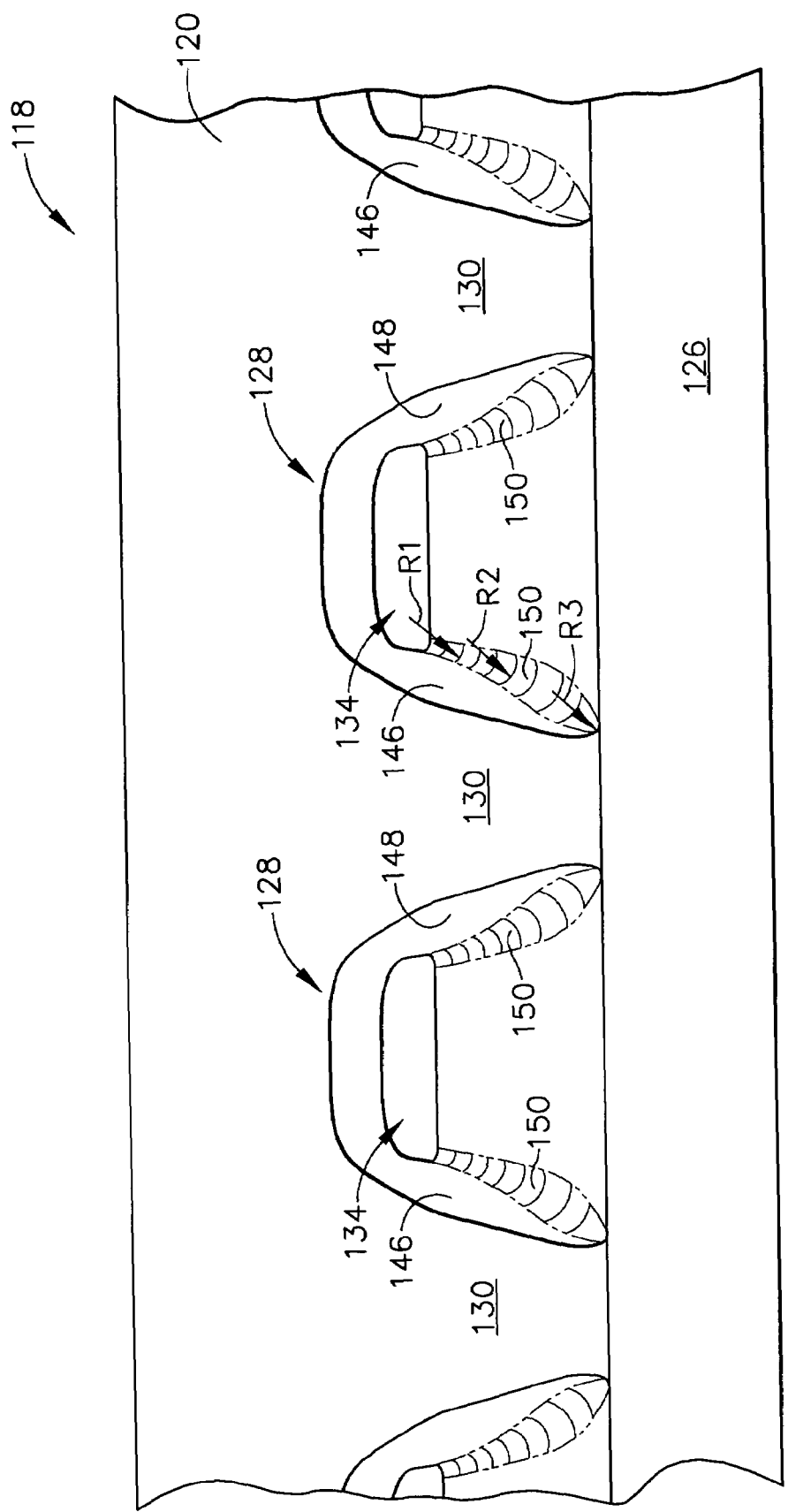
FIG. 10 is a rear view of a turbine airfoil showing a variable-radius slot fillet.

A concave fillet 150 is disposed between the side faces 146 and 148 and the suction sidewall 122, at the base 142 of the land 130. The radius "R" of the fillet 150 may be varied from the slot exit 134 to the trailing edge 126 to improve cooling film attachment. For example, as shown in FIG. 10, the fillet 150 may have a relatively small first radius R1 at the slot exit 134, increasing to a larger second radius R2 at a position axially aft of the slot exit 134, and then decreasing to an intermediate third radius R3 larger than the first radius R1 but smaller than the second radius R2, further downstream near the trailing edge 126. The fillet 150, the shape of the top surface 144 and the shape of the side faces 146 and 148 as described above may be selected to suit a particular application. For example, a particular land may include the curved top surface 144' depicted in FIG. 7 along with the concave side faces 146" and 148" shown in FIG. 9.

In operation, cooling air provided to the airfoil 110 flows through the interior thereof, where a portion of the flow may be used for cooling purposes such as convection, impingement, leading edge film cooling, etc., in a known manner. Cooling air then flows through the trailing edge slots 128 and out their exits 134, as shown by the arrows "A", to provide film cooling for the downstream suction sidewall 122. As the cooling air flows out the trailing edge slots 128, the tapered lands 130 encourage diffusion of the flow and promote attachment of a cooling film. The tapered lands 130 have a reduced hot land surface area compared to prior art trailing edge lands, further encouraging the exit film to spread wider and improve the film coverage.

The foregoing has described a cooled airfoil for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. An airfoil for a gas turbine engine, said airfoil having opposed pressure and suction sidewalls extending between a leading edge and a trailing edge, and comprising:
   an array of radially-spaced apart longitudinally-extending lands, said lands defining a plurality of trailing edge slots therebetween, each of said trailing edge slots having an inlet in fluid communication with an interior of said airfoil and an exit in fluid communication with said trailing edge;
   wherein at least one of said lands is tapered linearly such that a width of said land measured in a radial direction decreases from said suction sidewall to said pressure sidewall; and
   wherein said land comprises a base adjacent said suction sidewall, a ton adjacent said pressure sidewall and spaced-apart longitudinally extending side faces extending between said suction sidewall and said pressure sidewall with a concave fillet extending between each of said side faces and said suction sidewall, said fillet including a radius that varies from said exit to said trailing edge.

2. The airfoil of claim 1 in which a width of said land measured in a radial direction decreases from said exit to said trailing edge; and
   a thickness of said land measured in a circumferential direction decreases from said exit to said trailing edge.

3. The airfoil of claim 1 wherein are substantially planar.

4. The airfoil of claim 1 wherein said land includes a top surface disposed between said faces, said top surface having a convex curvature.

5. The airfoil of claim 1 wherein said land includes a top surface disposed between said faces, said top surface being substantially planar.

6. A turbine blade for a gas turbine engine comprising:
   an airfoil constructed according to claim 1;
   an arcuate platform connected to said airfoil; and
   a shank extending from said platform, said shank including a dovetail for being received in a rotor disk.

7. An airfoil for a gas turbine engine, said airfoil having opposed pressure and suction sides extending between a leading edge and a trailing edge, and comprising:
   an array of radially-spaced apart longitudinally-extending lands, said lands defining a plurality of trailing edge slots therebetween, each of said trailing edge slots having an inlet in fluid communication with an interior of said airfoil and an exit in fluid communication with said trailing edge;

wherein at least one of said lands is tapered such that:

a width of said land measured in a radial direction decreases from said suction sidewall to said pressure sidewall;

a width of said land measured in a radial direction decreases from said exit to said trailing edge; and a thickness of said land measured in a circumferential direction decreases from said exit to said trailing edge and wherein said land comprises a base adjacent said suction sidewall, a top adjacent said pressure sidewall and spaced-apart longitudinally extending side faces extending between said suction sidewall and said pressure sidewall with a concave fillet extending between each of said side faces and said suction sidewall, said fillet including a radius that varies from said exit to said trailing edge.

8. An airfoil for a gas turbine engine, said airfoil having opposed pressure and suction sidewalls extending between a leading edge and a trailing edge, and comprising:

an array of radially-spaced apart longitudinally-extending lands, said lands defining a plurality of trailing edge slots therebetween, each of said trailing edge slots having an inlet in fluid communication with an interior of said airfoil and an exit in fluid communication with said trailing edge;

wherein at least one of said lands is tapered such that a width of said land measured in a radial direction decreases from said suction sidewall to said pressure sidewall and a thickness of said land measured in a circumferential direction decreases from said exit to said trailing and wherein said at least one land comprises a base adjacent said suction sidewall, a top adjacent said pressure sidewall and spaced-apart longitudinally extending generally planar side faces extending between said suction sidewall and said pressure sidewall with a concave fillet extending between each of said side faces and said suction sidewall, said fillet including a radius that varies from said exit to said trailing edge.

9. The airfoil of claim 8 wherein said radius comprises a first radius adjacent said exit, a second radius larger than said first radius extending from said first radius towards said trailing edge, and a third radius larger than said first radius but smaller than said second radius adjacent said trailing edge.

* * * * *